US009175766B2

(12) United States Patent
Wi et al.

(10) Patent No.: US 9,175,766 B2
(45) Date of Patent: Nov. 3, 2015

(54) HYDRAULIC PRESSURE SUPPLY SYSTEM OF AUTOMATIC TRANSMISSION

(71) Applicant: Hyundai Motor Company, Seoul (KR)

(72) Inventors: Taehwan Wi, Bucheon-si (KR); Ki Dong Kim, Seoul (KR); Kyung Moo Lee, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 132 days.

(21) Appl. No.: 14/145,642

(22) Filed: Dec. 31, 2013

(65) Prior Publication Data

US 2015/0068340 A1   Mar. 12, 2015

(30) Foreign Application Priority Data

Sep. 11, 2013 (KR) ........................ 10-2013-0109094

(51) Int. Cl.
| | |
|---|---|
| *F16H 61/478* | (2010.01) |
| *F04C 14/26* | (2006.01) |
| *F16H 61/46* | (2010.01) |
| *F16H 61/4017* | (2010.01) |
| *F16H 61/00* | (2006.01) |

(52) U.S. Cl.
CPC .............. *F16H 61/461* (2013.01); *F04C 14/26* (2013.01); *F16H 61/0021* (2013.01); *F16H 61/0025* (2013.01); *F16H 61/4017* (2013.01); *F16H 61/478* (2013.01); *F16H 2061/0037* (2013.01); *Y10T 137/86002* (2015.04); *Y10T 137/86027* (2015.04)

(58) Field of Classification Search
CPC ................... F16H 2061/0037; F16H 61/4017; F16H 61/461; F16H 61/478; F04C 14/26; Y10T 137/86002; Y10T 137/86027
USPC ............. 417/253, 304, 308, 428; 137/565.13, 137/565.16; 60/464
See application file for complete search history.

(56) References Cited

U.S. PATENT DOCUMENTS

| | | | | |
|---|---|---|---|---|
| 5,797,732 | A * | 8/1998 | Watanabe et al. ............. | 417/310 |
| 6,112,718 | A * | 9/2000 | Bond ............................. | 123/310 |
| 6,138,638 | A * | 10/2000 | Morikawa ..................... | 123/295 |
| 6,361,287 | B1 * | 3/2002 | Hopper ......................... | 417/286 |
| 7,766,139 | B2 * | 8/2010 | De Maziere et al. ........ | 192/3.58 |
| 7,951,043 | B2 * | 5/2011 | Reisch et al. ................. | 477/156 |
| 8,038,416 | B2 * | 10/2011 | Ono et al. ..................... | 417/286 |
| 8,128,377 | B2 * | 3/2012 | Earhart et al. ................ | 417/216 |
| 8,322,135 | B2 * | 12/2012 | Kure et al. ...................... | 60/428 |
| 2007/0107421 | A1 * | 5/2007 | Emmert et al. ................ | 60/435 |
| 2011/0173965 | A1 * | 7/2011 | Holmes et al. ................. | 60/456 |

(Continued)

FOREIGN PATENT DOCUMENTS

| | | |
|---|---|---|
| JP | 09-075156 A | 3/1997 |
| JP | 10-266978 B2 | 10/1998 |

(Continued)

*Primary Examiner* — Atif Chaudry
(74) *Attorney, Agent, or Firm* — Morgan, Lewis & Bockius LLP

(57) ABSTRACT

A hydraulic pressure supply system of an automatic transmission for a vehicle is disclosed. The hydraulic pressure supply system is adapted to supply surplus hydraulic pressure recircluated from a high pressure portion and a shift control portion to a low pressure portion by connecting lines of the high pressure portion and the shift control portion to the low pressure portion.

15 Claims, 2 Drawing Sheets

(56) References Cited

U.S. PATENT DOCUMENTS

2012/0085441 A1* 4/2012 Park et al. ............... 137/565.11
2012/0141302 A1* 6/2012 Hwang ...................... 417/253

FOREIGN PATENT DOCUMENTS

JP    2003-239832 A    8/2003
JP    2011-163172 A    8/2011

* cited by examiner

HYDRAULIC PRESSURE SUPPLY SYSTEM OF AUTOMATIC TRANSMISSION

CROSS-REFERENCE TO RELATED APPLICATION

The present application claims priority to Korean Patent Application No. 10-2013-0109094 filed on Sep. 11, 2013, the entire contents of which is incorporated herein for all purposes by this reference.

BACKGROUND OF THE INVENTION

1. Field of the Invention

The present invention relates to a hydraulic pressure supply system of an automatic transmission for a vehicle. More particularly, the present invention relates to a hydraulic pressure supply system of an automatic transmission for a vehicle which can achieve a full discharge mode and a half discharge mode.

2. Description of Related Art

A gear pump is mainly used as a hydraulic pump applied to a hydraulic pressure supply system of an automatic transmission for a vehicle. However, a vane pump that can supply sufficient oil at a low speed region is recently used.

The vane pump increases discharge amount in proportion to a rotation speed thereof. If the vane pump is controlled to supply the sufficient oil at the low speed region, unnecessarily much oil is supplied and thereby causes driving loss of the pump at a high speed region.

Therefore, the vane pump includes first and second pump chambers disposed on a shaft of a rotor so as to recirculate surplus oil at the high speed region.

The first pump chamber is a main pump chamber, and hydraulic pressure generated at the first pump chamber is supplied to a high pressure portion (friction members, pulleys and so on).

In addition, the second pump chamber is a sub pump chamber, and hydraulic pressure generated at the second pump chamber is supplied selectively to the high pressure portion (friction members, pulleys and so on) or a low pressure portion (torque converter, cooling device, lubrication device and so on), or is recirculated.

In further detail, the hydraulic pressure generated at the first pump chamber and the second pump chamber is supplied to the high pressure portion if an engine speed is low, but the hydraulic pressure generated at the second pump chamber is recirculated to an inlet side if the engine speed is high. Therefore, driving loss of the pump may be minimized and fuel economy may be enhanced.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hydraulic pressure supply system of an automatic transmission for a vehicle having advantages of supplying surplus hydraulic pressure recirculated from a high pressure portion and a shift control portion to a low pressure portion by connecting lines of the high pressure portion and the shift control portion to the low pressure portion.

In an aspect of the present invention, a hydraulic pressure supply system of an automatic transmission for a vehicle, may include a hydraulic pump provided with first and second pump chambers formed therein, wherein the first and second pump chambers are connected to an oil pan respectively through first and second input lines and discharge generated hydraulic pressure respectively through first and second discharge lines, a high-pressure regulator valve disposed on a high-pressure line connected to the first discharge line and a high pressure portion, regulating hydraulic pressure supplied from the first and second pump chambers to the high pressure portion through the high-pressure line to stable hydraulic pressure, and supplying surplus hydraulic pressure at a regulating process of the high-pressure regulator valve to a low pressure portion, a first switch valve supplying hydraulic pressure of the second discharge line connected to the second pump chamber selectively to a first supply line connected to the high-pressure line through a bypass line or to a second supply line, a second switch valve selectively supplying hydraulic pressure of the first supply line to a third supply line or supplying hydraulic pressure of the second supply line to a fourth supply line, a solenoid regulator valve regulating hydraulic pressure supplied through the third and fourth supply lines to stable hydraulic pressure, supplying the stable hydraulic pressure to a shift control portion through a fifth supply line, and supplying surplus hydraulic pressure at a regulating process of the solenoid regulator valve to the low pressure portion, and a low-pressure regulator valve regulating the surplus hydraulic pressure supplied from the high-pressure regulator valve and the solenoid regulator valve to stable hydraulic pressure, supplying the stable hydraulic pressure to the low pressure portion, and supplying surplus hydraulic pressure at a regulating process of the low-pressure regulator valve to the first input line.

The high-pressure regulator valve and the low-pressure regulator valve are controlled by a first solenoid valve.

A recirculation line exhausting the surplus hydraulic pressure of the high-pressure regulator valve is connected to the low-pressure regulator valve and a recirculation line exhausting the surplus hydraulic pressure of the solenoid regulator valve.

The first switch valve is controlled by control pressure of a second solenoid valve and elastic force of an elastic member, and the hydraulic pressure of the shift control portion counteracting against the control pressure and the elastic force.

The hydraulic pressure of the shift control portion is supplied through a control pressure line bifurcated from the fifth supply line and connected to the first switch valve.

The second switch valve is controlled by control pressure of the second solenoid valve and elastic force of an elastic member counteracting against the control pressure.

The third supply line and the fourth supply line are connected to the solenoid regulator valve after being joined together.

An orifice is mounted at the third supply line.

In another aspect of the present invention, a hydraulic pressure supply system of an automatic transmission for a vehicle, may include a hydraulic pump provided with first and second pump chambers formed therein, wherein the first and second pump chambers are connected to an oil pan respectively through first and second input lines and discharge generated hydraulic pressure respectively through first and second discharge lines, a high-pressure regulator valve disposed on a high-pressure line connected to the first discharge line and a high pressure portion, and controlled by a first solenoid valve such that hydraulic pressure supplied from the first and second pump chambers to the high pressure portion through the high-pressure line is regulated to stable hydraulic pressure and surplus hydraulic pressure is supplied to a low pressure portion through a first recirculation line, a first switch valve controlled by a second solenoid valve and selectively connecting a first supply line connected to the high-pressure line through a bypass line or a second supply line to the second discharge line such that the hydraulic pressure generated at the second pump chamber is selectively supplied to the first supply line or the second supply line, a second switch valve controlled by the second solenoid valve, and supplying hydraulic pressure supplied through the first supply line to a third supply line or supplying hydraulic pressure supplied through the second supply line to a fourth supply line, a solenoid regulator valve regulating the hydraulic pressure supplied through the third supply line or the fourth supply line to stable hydraulic pressure, supplying the stable hydraulic pressure to a shift control portion through a fifth supply line, and supplying surplus hydraulic pressure to the low pressure portion, and a low-pressure regulator valve regulating the surplus hydraulic pressure supplied from the high-pressure regulator valve and the solenoid regulator valve to stable hydraulic pressure, supplying the stable hydraulic pressure to the low pressure portion, and recirculating surplus hydraulic pressure to the first input line through a second recirculation line.

The solenoid regulator valve supplies the surplus hydraulic pressure to the low pressure portion through a third recirculation line, wherein the first recirculation line is connected to the low-pressure regulator valve and the third recirculation line.

The first switch valve is controlled by control pressure of the second solenoid valve and elastic force of an elastic member, and the hydraulic pressure of the shift control portion counteracting against the control pressure and the elastic force.

The hydraulic pressure of the shift control portion is supplied through a control pressure line bifurcated from the fifth supply line and connected to the first switch valve.

The second switch valve is controlled by control pressure of the second solenoid valve and elastic force of an elastic member counteracting against the control pressure.

The third supply line and the fourth supply line are connected to the solenoid regulator valve after being joined together.

An orifice is mounted at the third supply line.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
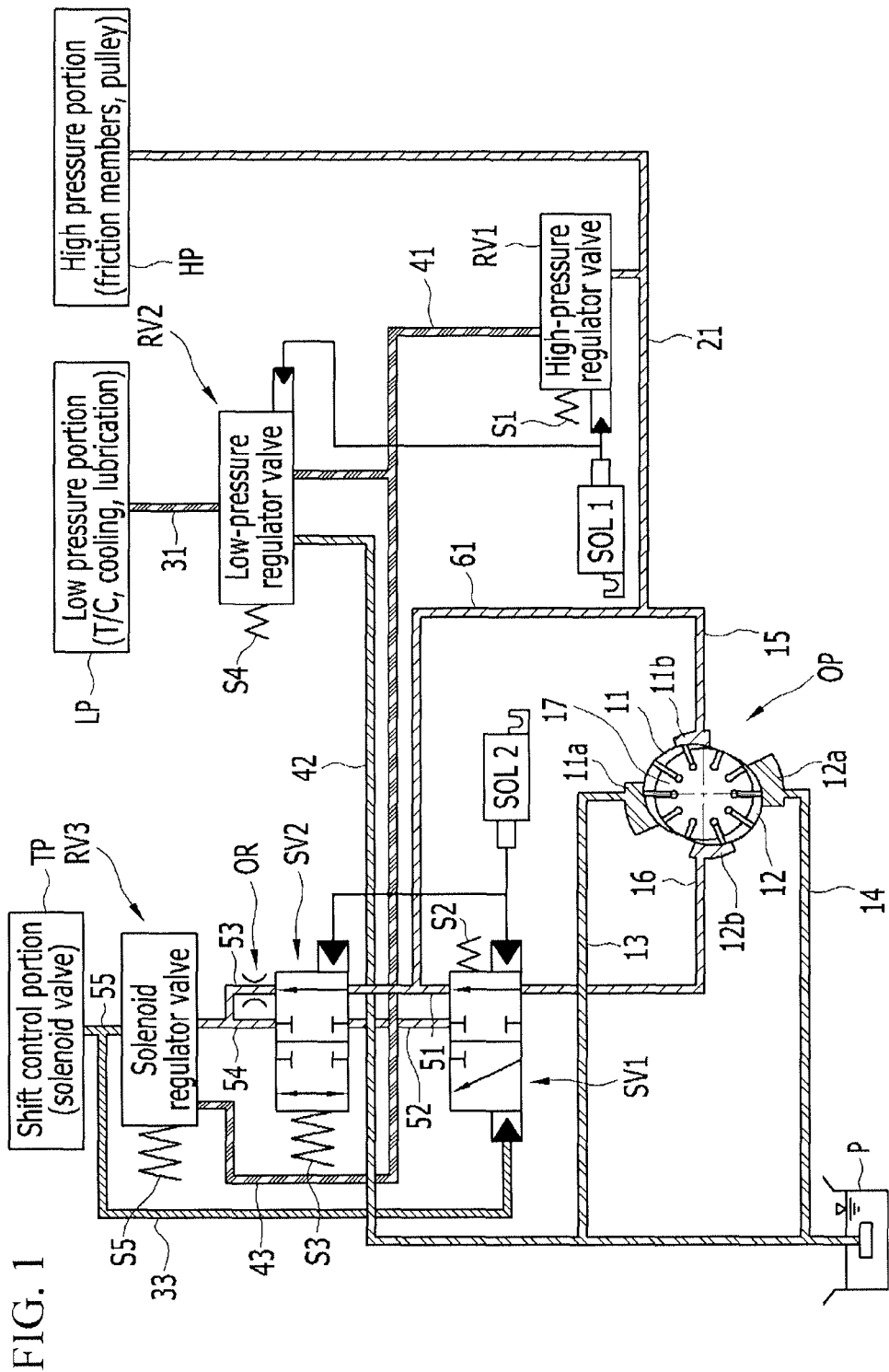
FIG. 1 is a schematic diagram of a hydraulic pressure supply system according to an exemplary embodiment of the present invention illustrating oil flow at a full discharge mode.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a hydraulic pressure supply system according to an exemplary embodiment of the present invention illustrating oil flow at a full discharge mode.

Referring to FIG. 1, a hydraulic pressure supply system according to an exemplary embodiment of the present invention includes a low pressure portion LP, a high pressure portion HP, and a shift control portion TP. Therefore, hydraulic pressure generated at a hydraulic pump OP is supplied to the low pressure portion LP, the high pressure portion HP and the shift control portion TP.

The low pressure portion LP represents a portion to which a low pressure facilitating operation of the torque converter (T/C) and cooling and lubrication is supplied, and the high pressure portion HP represents a portion to which a high pressure facilitating operation of a plurality of friction members that is selectively operated when shifting or a pulley (e.g., pulley for a CVT) is supplied.

In addition, the shift control portion TP means a plurality of solenoid valves controlling valves mounted in the automatic transmission.

The hydraulic pressure supply system according to the exemplary embodiment of the present invention including the low pressure portion LP, the high pressure portion HP and the shift control portion TP includes the hydraulic pump OP, a high-pressure regulator valve RV1, first and second switch valves SV1 and SV2, a low-pressure regulator valve RV2, and a solenoid regulator valve RV3.

The hydraulic pump OP is a vane pump and includes first and second pump chambers 11 and 12 formed therein. The first and second pump chambers 11 and 12 receive oil in an oil pan P respectively through first and second input lines 13 and 14, and hydraulic pressure generated at the first and second pump chambers 11 and 12 is supplied to the high pressure portion HP and the shift control portion TP respectively through first and second discharge lines 15 and 16.

The first pump chamber 11 and the second pump chamber 12 are formed symmetrically with respect to a rotor 17 in an axial direction.

The first pump chamber 11 is connected to the first input port 11a and the first discharge port 11b, and the second pump chamber 12 is connected to the second input port 12a and the second discharge port 12b.

The first and second input ports 11a and 12a are connected to the oil pan P respectively through the first and second input lines 13 and 14, and the first and second discharge ports 11b and 12b are connected respectively to the first and second discharge lines 15 and 16.

The first discharge line 15 is always connected to the high pressure portion HP through a high-pressure line 21, and the second discharge line 16 is connected to the first switch valve SV1.

The high-pressure regulator valve RV1 is disposed on the high-pressure line 21 connected to the high pressure portion HP, regulates the hydraulic pressure supplied from the first and second pump chambers 11 and 12 to the high pressure portion HP through the high-pressure line 21 to stable hydraulic pressure, and supplies surplus hydraulic pressure to the low pressure portion LP through a first recirculation line 41.

The high-pressure regulator valve RV1 is controlled by a first solenoid valve SOL1. The high-pressure regulator valve RV1 is controlled by control pressure supplied from the first solenoid valve SOL1 and elastic force of the first elastic member S1 so as to regulate the hydraulic pressure supplied to the high pressure portion HP to the stable hydraulic pressure and recirculate the surplus hydraulic pressure at a regulating process to the low pressure portion LP through the first recirculation line 41.

At this time, the first recirculation line 41 is connected to the high-pressure regulator valve RV1 and the low-pressure regulator valve RV2 so as to supply the hydraulic pressure to the low pressure portion LP.

The first switch valve SV1 is disposed between the second discharge line 16, and a first supply line 51 connected to the high-pressure line 21 through a bypass line 61 and a second supply line 52. Therefore, the hydraulic pressure generated at the second pump chamber 12 is supplied selectively to the first supply line 51 or the second supply line 52 by the first switch valve SV1.

The first switch valve SV1 is controlled by a second solenoid valve SOL2. The first switch valve SV1 is controlled by control pressure of the second solenoid valve SOL2 and elastic force of an second elastic member S2, and hydraulic pressure bypassed from the shift control portion TP counteracting against the control pressure and the elastic force so as to selectively connect the second discharge line 16 to the first supply line 51 or the second supply line 52.

Therefore, the first switch valve SV1 supplies the hydraulic pressure supplied from the second discharge line 16 to the high-pressure line 21 through the bypass line 61 bifurcated from the first supply line 51, or to the second switch valve SV2.

The second switch valve SV2 is disposed between the first and second supply lines 51 and 52, and third and fourth supply lines 53 and 54 connected to each other. The second switch valve SV2 supplies hydraulic pressure supplied through the first and second supply lines 51 and 52 selectively to the third supply line 53 or the fourth supply line 54, respectively.

The second switch valve SV2 is controlled by the second solenoid valve SOL2. The second switch valve SV2 is controlled by the control pressure supplied from the second solenoid valve SOL2 and elastic force of a third elastic member S3 counteracting the control pressure so as to connect the first supply line 51 to the third supply line 53 or connect the second supply line 52 to the fourth supply line 54.

Therefore, the second switch valve SV2 supplies the hydraulic pressure supplied from the first supply line 51 to the solenoid regulator valve RV3 through the third supply line 53, or supplies the hydraulic pressure supplied from the second supply line 52 to the solenoid regulator valve RV3 through the fourth supply line 54.

Herein, an orifice OR is mounted on the third supply line 53. The orifice OR prevents excess oil from passing through the third supply line 53. That is, it is prevented by the orifice OR that the hydraulic pressure of the second pump chamber 12 is excessively supplied to the solenoid regulator valve RV3 at a full discharge mode.

The first and second switch valves SV1 and SV2 are simultaneously controlled by the second solenoid valve SOL2.

The low-pressure regulator valve RV2 is disposed on the first recirculation line 41, is connected to the low pressure portion LP through a low-pressure line 31, and is connected to the first input line 13 through a second recirculation line 42.

In addition, the low-pressure regulator valve RV2 is connected to a third recirculation line 43 of the solenoid regulator valve RV3 joined to the first recirculation line 41.

The low-pressure regulator valve RV2 is controlled by the first solenoid valve SOL1. The low-pressure regulator valve RV2 is controlled by the control pressure supplied from the first solenoid valve SOL1 and elastic force of a fourth elastic member S4 counteracting against the control pressure so as to receive the surplus hydraulic pressure from the high-pressure regulator valve RV1 and the solenoid regulator valve RV3 through the first and third recirculation lines 41 and 43 and regulate the hydraulic pressure supplied to the low pressure portion LP through the low-pressure line 31 to be stable.

In addition, the surplus hydraulic pressure of the low pressure portion LP at a regulating process of the low-pressure regulator valve RV2 is recirculated to the first input line 13 through the second recirculation line 42.

The solenoid regulator valve RV3 is connected to the second switch valve SV2 through the third and fourth supply lines 53 and 54, and is connected to the shift control portion TP through a fifth supply line 55.

The solenoid regulator valve RV3 is controlled by elastic force of a fifth elastic member S5 mounted at a side thereof so as to regulate the hydraulic pressure supplied from the third and fourth supply lines 53 and 54 to be stable. In addition, the solenoid regulator valve RV3 supplies the regulated hydraulic pressure to the shift control portion TP through the fifth supply line 55, and supplies the surplus hydraulic pressure at a regulating process to the low-pressure regulator valve RV2 through the third recirculation line 43.

Herein, a control pressure line 33 is bifurcated from the fifth supply line 55 and is connected to the first switch valve SV1. Therefore, the hydraulic pressure of the fifth supply line 55 is bypassed through the control pressure line 33 and is supplied to the first switch valve SV1 as control pressure.

The hydraulic pressure supply system according to the exemplary embodiment of the present invention is controlled to be operated at the full discharge mode at initial starting and when stopped.

Referring to FIG. 1, the second solenoid valve SOL2 is switched on at the full discharge mode (low speed region) such that the first switch valve SV1 connects the second discharge line 16 to the first supply line 51 from which the bypass line 61 is bifurcated, and the second switch valve SV2 connects the first supply line 51 to the third supply line 53.

At this time, the hydraulic pressure generated at the first pump chamber 11 of the hydraulic pump OP is supplied to the high pressure portion HP through the first discharge line 15 and the high-pressure line 21.

In addition, the hydraulic pressure generated at the second pump chamber 12 of the hydraulic pump OP is supplies to the high pressure portion HP through the bypass line 61 after passing through the second discharge line 16 and the first switch valve SV1 and is supplied to the solenoid regulator valve RV3 through the first supply line 51, the second switch valve SV2 and the third supply line 53.

At this time, the surplus hydraulic pressure generated at the regulating process of the high-pressure regulator valve RV1 is supplied to the low-pressure regulator valve RV2 through the first recirculation line 41, and the surplus hydraulic pressure generated at the regulating process of the solenoid regulator valve RV3 is also supplied to the low-pressure regulator valve RV2 through the third recirculation line 43 and the first recirculation line 41.

That is, the surplus hydraulic pressure exhausted from the high pressure portion HP and the shift control portion TP is supplied to the low pressure portion LP.

Figure 2:
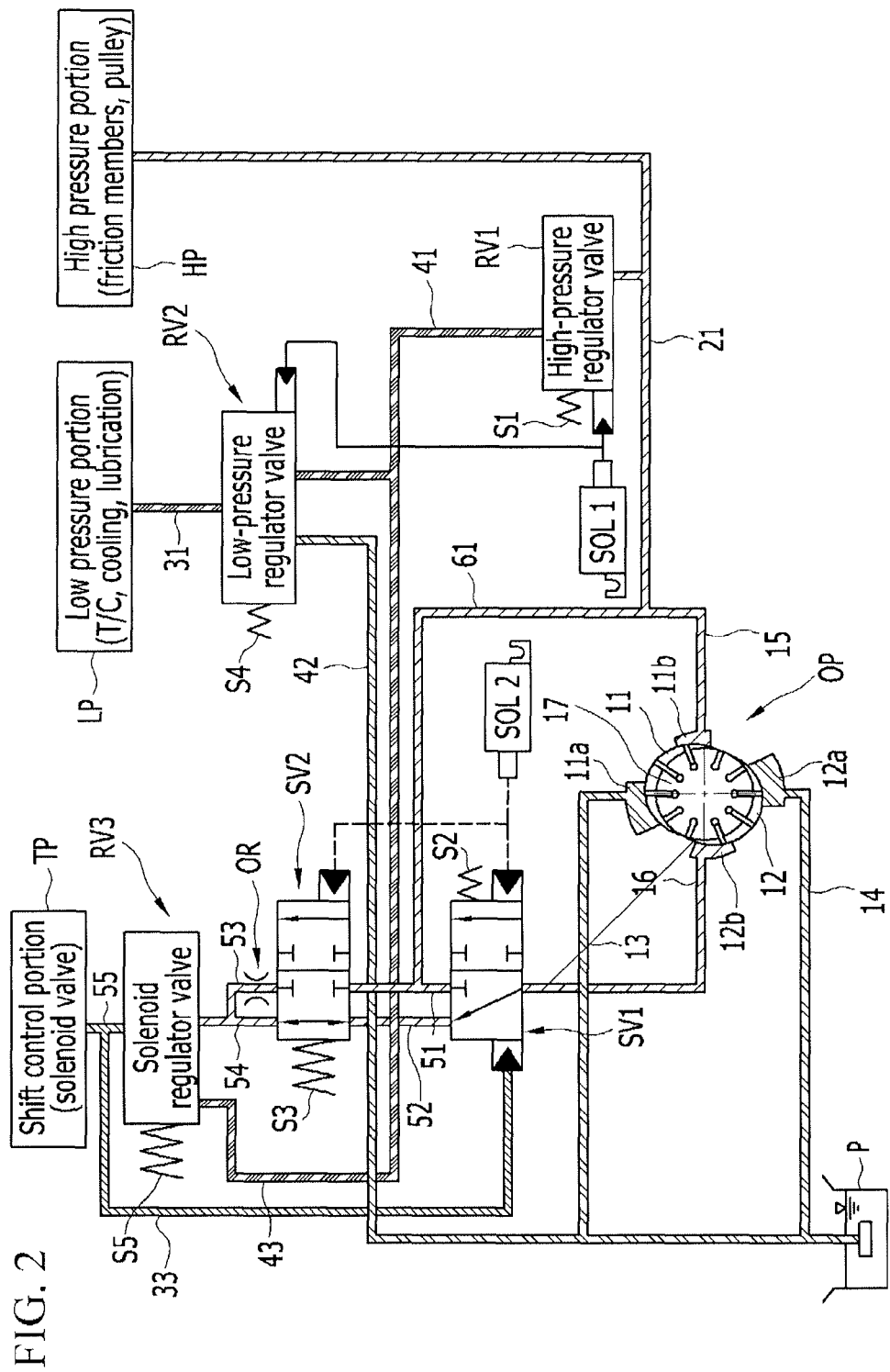
FIG. 2 is a schematic diagram of a hydraulic pressure supply system according to an exemplary embodiment of the present invention illustrating oil flow at a half discharge mode.

FIG. 2 is a schematic diagram of a hydraulic pressure supply system according to an exemplary embodiment of the present invention illustrating oil flow at a half discharge mode.

Referring to FIG. 2, if the engine speed becomes higher (reaching to a high speed region) during the vehicle runs at the full discharge mode, the second solenoid valve SOL2 is switched off.

In this case, the first switch valve SV1 connects the second discharge line 16 to the second supply line 52, and the second switch valve 18 connects the second supply line 52 to the fourth supply line 54.

At this time, the hydraulic pressure generated at the first pump chamber 11 of the hydraulic pump OP is supplied to the high pressure portion HP through the first discharge line 15 and the high-pressure line 21.

In addition, the hydraulic pressure generated at the second pump chamber 12 of the hydraulic pump OP is supplied to the solenoid regulator valve RV3 through the second discharge line 16, the first switch valve SV1, the second supply line 52, the second switch valve SV2, and the fourth supply line 54.

At this time, the surplus hydraulic pressure generated at the regulating process of the high-pressure regulator valve RV1 is supplied to the low-pressure regulator valve RV2 through the first recirculation line 41, and the surplus hydraulic pressure generated at the regulating process of the solenoid regulator valve RV3 is supplied to the low-pressure regulator valve RV2 through the third recirculation line 43 and the first recirculation line 41.

That is, the surplus hydraulic pressure exhausted from the high pressure portion HP and the shift control portion TP is supplied to the low pressure portion LP, the same as at the full discharge mode.

The hydraulic pressure supply system according to the exemplary embodiment of the present invention supplies the hydraulic pressure generated at the first pump chamber 11 of the hydraulic pump OP to the high pressure portion HP through the high-pressure line 21, and supplies the hydraulic pressure generated at the second pump chamber 12 to the high pressure portion HP and the shift control portion TP at the full discharge mode.

At this time, since the hydraulic pressure supplied to the shift control portion TP is suppressed not to be excess by the orifice OR disposed on the third supply line 53, majority of the hydraulic pressure generated at the hydraulic pump OP is supplied to the high pressure portion HP. Therefore, initial starting is smoothly performed. At this time, the surplus hydraulic pressure exhausted from the high pressure portion HP and the shift control portion TP is supplied to the low pressure portion LP.

In addition, the hydraulic pressure generated at the first pump chamber 11 of the hydraulic pump OP is supplied to the high pressure portion HP through the high-pressure line 21, and the hydraulic pressure generated at the second pump chamber 12 is supplied to the shift control portion TP through the first and second switch valves SV1 and SV2 and the solenoid regulator valve RV3 at a half discharge mode.

In addition, since the surplus hydraulic pressure exhausted from the high-pressure regulator valve RV1 and the solenoid regulator valve RV3 is supplied to the low-pressure regulator valve RV2, oil amount of the low pressure portion LP increases. In addition, since oil amount necessary for the high pressure portion HP is reduced, an engine RPM entering the half discharge mode is lowered and thus fuel economy may be enhanced.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A hydraulic pressure supply system of an automatic transmission for a vehicle, comprising:

a hydraulic pump provided with first and second pump chambers formed therein, wherein the first and second pump chambers are connected to an oil pan respectively through first and second input lines and discharge generated hydraulic pressure respectively through first and second discharge lines;

a high-pressure regulator valve disposed on a high-pressure line connected to the first discharge line and a high pressure portion, regulating hydraulic pressure supplied from the first and second pump chambers to the high pressure portion through the high-pressure line to stable hydraulic pressure, and supplying surplus hydraulic pressure at a regulating process of the high-pressure regulator valve to a low pressure portion;

a first switch valve supplying hydraulic pressure of the second discharge line connected to the second pump chamber selectively to a first supply line connected to the high-pressure line through a bypass line or to a second supply line;

a second switch valve selectively supplying hydraulic pressure of the first supply line to a third supply line or supplying hydraulic pressure of the second supply line to a fourth supply line;

a solenoid regulator valve regulating hydraulic pressure supplied through the third and fourth supply lines to stable hydraulic pressure, supplying the stable hydraulic pressure to a shift control portion through a fifth supply line, and supplying surplus hydraulic pressure at a regulating process of the solenoid regulator valve to the low pressure portion; and a low-pressure regulator valve regulating the surplus hydraulic pressure supplied from the high-pressure regulator valve and the solenoid regulator valve to stable hydraulic pressure, supplying the stable hydraulic pressure to the low pressure portion, and supplying surplus hydraulic pressure at a regulating process of the low-pressure regulator valve to the first input line.

2. The hydraulic pressure supply system of claim 1, wherein the high-pressure regulator valve and the low-pressure regulator valve are controlled by a first solenoid valve.

3. The hydraulic pressure supply system of claim 1, wherein a recirculation line exhausting the surplus hydraulic pressure of the high-pressure regulator valve is connected to the low-pressure regulator valve and a recirculation line exhausting the surplus hydraulic pressure of the solenoid regulator valve.

4. The hydraulic pressure supply system of claim 1, wherein the first switch valve is controlled by control pressure of a second solenoid valve and elastic force of an elastic member, and the hydraulic pressure of the shift control portion counteracting against the control pressure and the elastic force.

5. The hydraulic pressure supply system of claim 4, wherein the hydraulic pressure of the shift control portion is supplied through a control pressure line bifurcated from the fifth supply line and connected to the first switch valve.

6. The hydraulic pressure supply system of claim 1, wherein the second switch valve is controlled by control pressure of the second solenoid valve and elastic force of an elastic member counteracting against the control pressure.

7. The hydraulic pressure supply system of claim 1, wherein the third supply line and the fourth supply line are connected to the solenoid regulator valve after being joined together.

8. The hydraulic pressure supply system of claim 1, wherein an orifice is mounted at the third supply line.

9. A hydraulic pressure supply system of an automatic transmission for a vehicle, comprising:

a hydraulic pump provided with first and second pump chambers formed therein, wherein the first and second pump chambers are connected to an oil pan respectively through first and second input lines and discharge generated hydraulic pressure respectively through first and second discharge lines;

a high-pressure regulator valve disposed on a high-pressure line connected to the first discharge line and a high pressure portion, and controlled by a first solenoid valve such that hydraulic pressure supplied from the first and second pump chambers to the high pressure portion through the high-pressure line is regulated to stable hydraulic pressure and surplus hydraulic pressure is supplied to a low pressure portion through a first recirculation line;

a first switch valve controlled by a second solenoid valve and selectively connecting a first supply line connected to the high-pressure line through a bypass line or a second supply line to the second discharge line such that the hydraulic pressure generated at the second pump chamber is selectively supplied to the first supply line or the second supply line;

a second switch valve controlled by the second solenoid valve, and supplying hydraulic pressure supplied through the first supply line to a third supply line or supplying hydraulic pressure supplied through the second supply line to a fourth supply line;

a solenoid regulator valve regulating the hydraulic pressure supplied through the third supply line or the fourth supply line to stable hydraulic pressure, supplying the stable hydraulic pressure to a shift control portion through a fifth supply line, and supplying surplus hydraulic pressure to the low pressure portion; and a low-pressure regulator valve regulating the surplus hydraulic pressure supplied from the high-pressure regulator valve and the solenoid regulator valve to stable hydraulic pressure, supplying the stable hydraulic pressure to the low pressure portion, and recirculating surplus hydraulic pressure to the first input line through a second recirculation line.

10. The hydraulic pressure supply system of claim 9, wherein the solenoid regulator valve supplies the surplus hydraulic pressure to the low pressure portion through a third recirculation line, and wherein the first recirculation line is connected to the low-pressure regulator valve and the third recirculation line.

11. The hydraulic pressure supply system of claim 9, wherein the first switch valve is controlled by control pressure of the second solenoid valve and elastic force of an elastic member, and the hydraulic pressure of the shift control portion counteracting against the control pressure and the elastic force.

12. The hydraulic pressure supply system of claim 11, wherein the hydraulic pressure of the shift control portion is supplied through a control pressure line bifurcated from the fifth supply line and connected to the first switch valve.

13. The hydraulic pressure supply system of claim 9, wherein the second switch valve is controlled by control pressure of the second solenoid valve and elastic force of an elastic member counteracting against the control pressure.

14. The hydraulic pressure supply system of claim 9, wherein the third supply line and the fourth supply line are connected to the solenoid regulator valve after being joined together.

15. The hydraulic pressure supply system of claim 9, wherein an orifice is mounted at the third supply line.

* * * * *